United States Patent [19]

Rigollot

[11] 4,021,299
[45] May 3, 1977

[54] METHOD OF WORKING A COMBINED NUCLEAR-FOSSIL FUEL CYCLE AND DEVICE FOR USING SAME

[76] Inventor: Georges Alfred Rigollot, 66, Avenue Henri Martin, 75116 Paris, France

[22] Filed: Nov. 20, 1974

[21] Appl. No.: 525,386

[30] Foreign Application Priority Data

Nov. 29, 1973 France .......................... 73.42560

[52] U.S. Cl. .................. 176/39; 176/65; 60/39.55; 60/644; 126/360 A
[51] Int. Cl.$^2$ ......................................... G21D 5/02
[58] Field of Search ............. 176/39, 65; 60/39.53, 60/39.55, 644; 126/360 A

[56] References Cited

UNITED STATES PATENTS

| | | | |
|---|---|---|---|
| 2,981,250 | 4/1961 | Stewart | 126/360 A |
| 3,309,282 | 3/1967 | Maldague | 176/65 |
| 3,329,575 | 7/1967 | Burbach et al. | 176/65 |
| 3,444,401 | 5/1969 | Gilli | 176/39 X |
| 3,575,002 | 4/1971 | Vuia | 60/644 |
| 3,583,156 | 6/1971 | Schabert | 60/644 |
| 3,649,469 | 3/1972 | MacBeth | 60/39.55 X |
| 3,747,588 | 7/1973 | Booth | 126/360 A |
| 3,792,690 | 2/1974 | Cooper | 123/3 |
| 3,832,845 | 9/1974 | Aguet | 60/39.55 X |

Primary Examiner—Samuel W. Engle
Assistant Examiner—Peter A. Nelson

[57] ABSTRACT

A method of working a combined nuclear-fossil fuel cycle consisting in generating steam in a nuclear reactor, admitting fossil fuel into a regenerator operating with oxygen and effecting the gasification of the fuel therein and raising the heat potential of the steam supplied by the reactor; feeding the steam into a burner and reacting the gaseous fuel with oxygen therein and then causing the mixture of combustion products and steam to work in a turbine driving an alternator.

9 Claims, 2 Drawing Figures

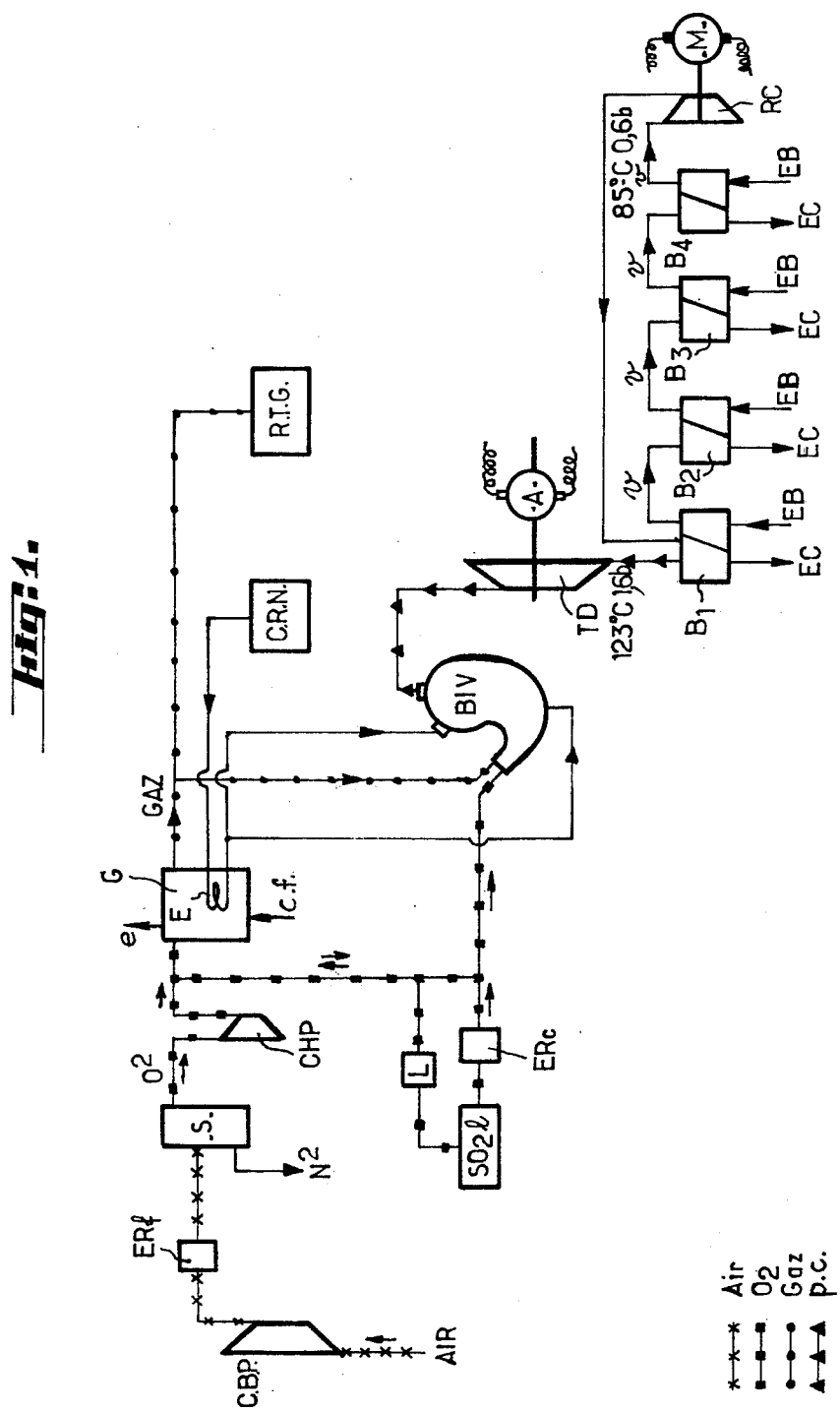

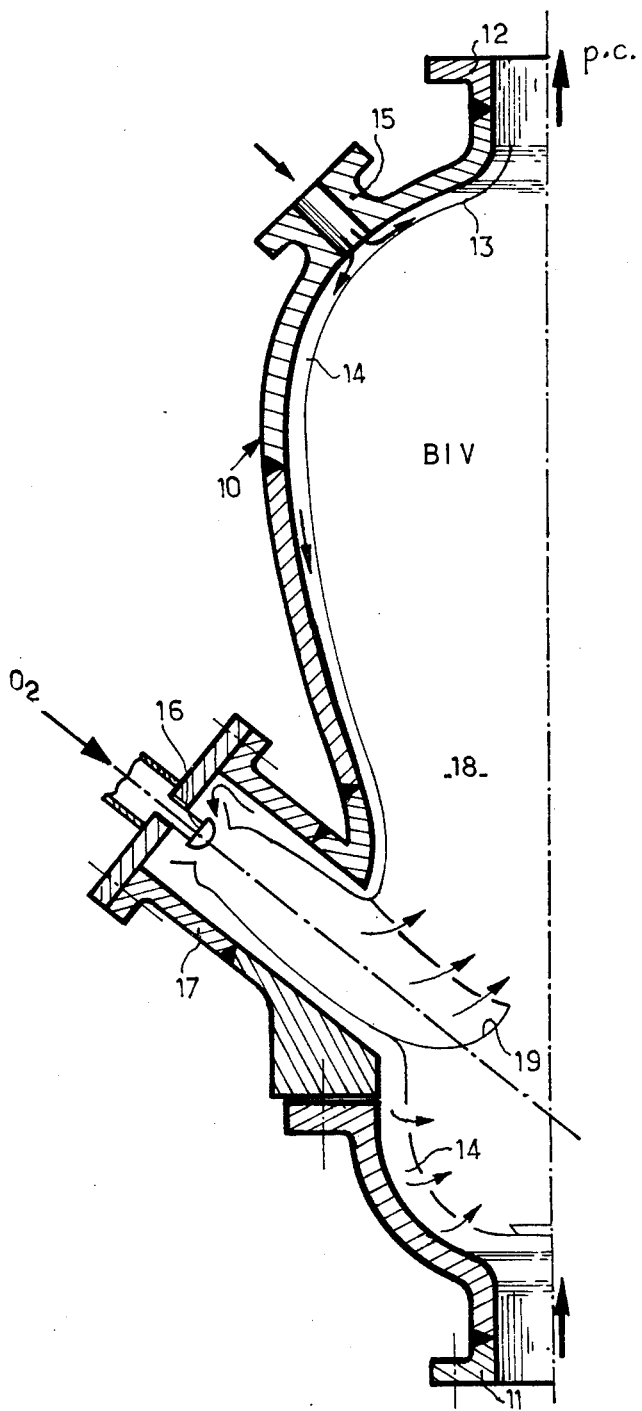

METHOD OF WORKING A COMBINED NUCLEAR-FOSSIL FUEL CYCLE AND DEVICE FOR USING SAME

The present invention relates to the use of a combined nuclear-fossil fuel cycle enabling by using up a relatively small proportion of fossil fuel with respect to nuclear fuel to significantly facilitate recovery of the energy produced within the nuclear reactor by increasing the output powers, by simplifying the technology used and by solving the attendant pollution and cooling problems thereby to provide for the freedom of localization.

The method of using a combined nuclear-fossil fuel cycle according to the invention is characterized by the steps of generating steam within a nuclear reactor, admitting fossil fuel within a regenerator operating with oxygen and effecting the gasification of the fuel therein and raising the heat potential of the steam supplied by the reactor, and afterwards feeding the steam into a burner and reacting the gaseous fuel with oxygen and then causing the mixture of the combustion products and steam to produce work in a turbine which drives an alternator.

In this manner it is possible to use in conjunction with the nuclear reactor any fossil fuel such as fuel-oil and coal in particular of poor quality. As the regenerator operates with oxygen as well as the burner the cycle does not involve the use of a large amount of nitrogen which would be present if atmospheric air is used and which would substantially decrease the exchange potential for recovery of the steam at the turbine exhaust and considerably increase the amount of parasitic or extra compression energy. Moreover when doing this the combustion products practically include now steam and carbon dioxide only which may be easily released without any pollution.

According to another characterizing feature of the invention a part of the gas formed through gasification of the fossil fuel during the off-peak or idle period of time of plant operation is stored. It is also possible to store oxygen which may be produced for instance through distillation and liquefaction of air. Thus the fossil fuel will be essentially used for supplying for instance the electrical power during peak hours of consumption.

According to a further characterizing feature of the invention after or downstream the expansion turbine the steam admixed with the combustion products is used as a looping make-up in a recompression distillation station comprising a number of boilers arranged in cascade and forming exchangers enabling to distil very large amounts of water, for instance sea water.

For carrying out the process described hereinabove and according to another important characterizing feature of the invention the method uses as a common burner a burner comprising an outer mechanically strong casing or shell made for instance from steel, an inner wall adjacent to said outer casing, a steam inlet at the lower portion, steam injectors opening into the space located between said casing and said wall and injectors for oxygen and gaseous fuel for submerged combustion extending through said space and opening slantwise into the burner chamber while providing for the mixing or stirring of the mixture of the combustion products, a combustion gas outlet being provided at the upper portion of the burner. Thus is achieved a quite complete combustion while producing smoke which contains carbon dioxide and steam only and these combustion products may be obtained under optimum pressure and temperature for driving an expansion turbine which will power an alternator for supplying the desired electrical energy.

According to another application of this immersion or submerged combustion burner the latter may be used for carrying out the dilution and cooling of the combustion gases by the steam directly produced from water fed instead of the main steam flow at the bottom of the apparatus.

In operation with a combined nuclear-fossil fuel cycle the flow rate of steam of nuclear origin may be kept at a constant value. The variation of power supplied by the electrical plant then depends upon the temperature of the mixture of steam and combustion products admitted into the turbine for providing the desired modulation of the electrical power output.

The invention will be better understood and further objects, characterizing features, details and advantages thereof will appear more clearly as the following explanatory description proceeds with reference to the accompanying diagrammatic drawings given by way of a non limiting example only illustrating one presently preferred form of embodiment of the invention and wherein:

FIG. 1 is a block diagram showing the operating principle of a plant working according to the method of the invention; and FIG. 2 is a vertical half cross section of a burner advantageously used in a plant operating according to the process of the invention.

Reference should be made at first to the diagram according to FIG. 1 in which the caption enables to more easily follow the various flow circuits in particular of the fuel or combustible gas, oxygen, combustion products and air. Atmospheric air is admitted to the low pressure compressor or booster $C_{BP}$ and after flowing through a cooling exchanger ERf is fed into the separator S effecting the separation of oxygen $O_2$ and nitrogen $N_2$. Oxygen is then compressed within the high pressure booster or compressor $C_{HP}$. Oxygen under pressure is admitted into the gas generator G and also into the burner BIV submerged within the steam. Concurrently oxygen may be liquified in a liquifier unit L and stored within a liquid oxygen storage tank $SO_2l$ during off-peak hours of operation of the plant. During peak hours the liquified oxygen is regasified within the heating exchanger $ER_c$ for being fed into the burner BIV and into the gas generator G.

The gas generator G also receives the fossil fuel c.f., which may be for instance fuel-oil which will be gasified to essentially form carbon oxide CO and hydrogen $H_2$. The impurities contained in the fossil fuel such as sulphur for instance will be removed through the outlet e and recovered. During the operating period of time of the plant the gas supplied by the generator G is fed to the burner BIV. During off-peak hours the gas may be stored in a buffer-tank RTG which will be used at decompression during peak hours of consumption.

The boiler of the nuclear reactor CRN supplies at a constant flow rate if need be steam at a low heat potential. It will be heated up again by flowing through an exchanger E which receives its heat from the gas generator G. It is then admitted into the burner BIV.

The burner BIV the original design and operation of which will be described hereinafter with reference to FIG. 2 also receives at the lower portion the main steam flux. The mixture of the steam and the combustion products at high temperature and pressure is delivered to an expansion turbine TD which drives an alternator A producing the desired electrical energy.

At the outlet of the expansion turbine TD the combustion products consisting essentially of water and carbon dioxide may be conveyed to a natural draught cooling tower (not shown) requiring no special precaution with respect to layout or site.

Alternatively as shown in the diagram of FIG. 1, the combustion products and the looping steam from the last water distillation stage (boiler $B_4$) may be fed to a boiler $B_1$ which will condense the water of both the combustion products and this additional steam, the cooling being provided by the raw water EB supplied in counter-flow relationship. The raw water used may be sea water for instance. Thus condensed water EC is recovered in the boiler-exchanger $B_1$. Raw water EB is also fed into this boiler and steam v is recovered and fed to the first stage of a second boiler $B_2$ of a construction similar to that of boiler $B_1$. Condensed water EC is recovered in this second boiler $B_2$ and there is admitted in counter-flow relationship raw water for instance sea water which is converted into steam and which is fed to a third boiler $B_3$, etc...

As the various boilers are operating in cascade-like fashion the temperature and pressure of the steam admitted into the various boilers decrease gradually. It is for instance possible to use four boilers connected in series $B_1$, $B_2$, $B_3$, $B_4$, the steam input temperature and pressure in the boiler $B_1$ being 123° C and 1.6 bar, respectively, the steam output temperature and pressure in the fourth boiler $B_4$ being 85° C and 0.6 bar, respectively. The steam produced within the boiler $B_4$ may be condensed in a condenser or preferably as shown recompressed within a booster or compressor RC driven by a motor M and reinjected as additional steam under the required pressure of 1.6 bar into the first stage of the boiler $B_1$ as shown.

Of course the brine produced in each boiler-exchanger as well as the carbon dioxide which has separated therefrom in the boiler $B_1$ may likewise be drawn off. Such a plant may supply a considerable amount of soft water through distillation of sea water.

Reference should now be had to FIG. 2 wherein has been accurately shown the immersion or submerged combustion burner BIV used in the diagram of FIG. 1. This burner comprises an outer mechanically strong casing 10 made for instance from steel and consisting of several parts or elements welded together. At the lower portion of the burner is provided a steam or water inlet 11 according to the use of the apparatus as a burner submerged either in steam or in water and at the upper portion is provided an outlet 12 for the combustion products. An inner wall 13 consisting for instance of a stainless steel sheet of small gauge or thickness is fitted adjacent to the wall 10 while leaving a space 14 between this wall and itself.

At the upper portion of the burner are provided a number of steam injectors 15 which open into the space 14.

In the lower portion of the burner are provided oxygen and fuel gas injectors 16 which open through slanting ducts or passageways 17 into the chamber proper 18 of the burner. The wall 13 advantageously exhibits deflectors or baffles 19 which provide for a good orientation or suitable flow direction of the combustion products.

The operation of the burner described hereinabove is the following. The space 14 provided between the outer casing or shell 10 and the wall 13 is permanently fed in the upper portion with steam and in the lower portion with steam or water. This arrangement provides for a good heat insulation of the outer casing 10 of the burner with respect to the chamber 18 in which the combustion products are circulating. It is then easy to build the casing 10 so that it may withstand (at not too high a temperature) very high pressures. The inner wall 13 has to withstand no pressure since it only serves as a heat shield or protective screen keeping the insulating water and steam layer or cushion within the space 14 in contact with the outer casing 10. The water level at the bottom of the burner is kept under these optimum operating conditions for the desired working rate. At the upper portion of the burner the combustion products are directly admitted at the desired pressure and temperature into the expansion turbine TD (FIG. 1).

It should be understood that the invention is not at all limited to the form of embodiment described and shown which has been given by way of example only as the invention may apply and be integrated into various other working cycles. The invention therefore comprises all the technical equivalents of the means described as well as their combinations if the latter are carried out according to its gist and used within the scope of the appended claims.

In particular the burner BIV described and illustrated in FIG. 2 may be used in other cycles than the combined nuclear-fossil fuel cycle described, for instance in the case where a steam source from a conventional plant or as a burner submerged in water is available.

What is claimed is:

1. In a method of driving an alternator with steam generated by a nuclear reactor and heated by combustion of a fossil-fuel the improvement comprising introducing a fossil-fuel and substantially pure oxygen into a regenerator, passing steam generated by a nuclear reactor into said regenerator, effecting gasification of the fossil-fuel in said regenerator by formation of CO and $H_2$ and thereby increasing the heat potential of the steam therein, introducing the thus heated steam and the gasified fuel from said regenerator into a common burner and reacting said gasified fuel with oxygen therein, and passing the mixture of steam and combustion products from said burner to a turbine to drive same and an alternator drivably connected thereto.

2. A method according to claim 1, further comprising the steps of producing the required oxygen through air liquefaction and distillation, recovering the nitrogen and storing the liquid oxygen during off-peak hours of plant operation.

3. A method according to claim 1, further comprising the step of storing one part of the gas formed through gasification of said fossil fuel during off-peak hours of plant operation.

4. A method according to claim 1, wherein a submerged combustion burner is used as said common burner.

5. A method according to claim 4, comprising the steps of condensing at the outlet of said turbine the steam formed producing soft water and steam within a first boiler-exchanger and using step by step several stages of boilers-exchangers arranged in cascade-like relationship in which the pressure and temperature of the steam produced and condensed are decreasing to a minimum pressure at the inlet of a compressor provided for the looping of said cycle by recompressing the steam produced within the last stage and feeding it back to the inlet of the first boiler.

6. In a combined nuclear-fossil-fuel cycle system for driving of an alternator in which the steam generated in a nuclear reactor is used as part of the working fluid the improvement comprising a common burner admitting the steam generated by the nuclear reactor, fossil-fuel and substantially pure oxygen, said burner comprising an outer mechanically strong casing, an inner wall adjacent to but spaced from said outer casing, a steam inlet in the lower portion of the burner, at least one steam injector opening into the space between said casing and said wall, and injectors for oxygen and fuel gas for submerged combustion extending through said space and opening slantwise into the burner chamber defined by said wall and providing a stirring of the mixture of the combustion products, an outlet being provided at the upper portion of said burner for the discharge of a mixture of combustion products and steam.

7. A system according to claim 6, wherein said burner has a cylindrical shape of revolution about a vertical axis and a plurality of gas and oxygen injectors are angularly distributed about said burner.

8. In a method of driving an alternator with steam generated by a nuclear reactor and heated by combustion of a fossil-fuel the improvement comprising producing substantially pure oxygen by liquification of air and distillation, recovering nitrogen and storing the liquid oxygen during off-peak hours of plant operation, introducing a fossil-fuel and substantially pure oxygen, at least a portion of which comprises liquid oxygen which has been regasified, into a regenerator, passing steam generated by a nuclear reactor into said regenerator, effecting gasification of the fossil-fuel in said regenerator by formation of CO and $H_2$ and thereby increasing the heat potential of the steam therein, introducing the thus heated steam and the gasified fuel from said regenerator into a common burner and reacting said gasified fuel with oxygen therein, and passing the mixture of steam and combustion products from said burner to a turbine to drive same and on alternator drivably connected thereto.

9. In a method driving an alternator with steam generated by a nuclear reactor and heated by combustion of a fossil-fuel the improvement comprising introducing a fossil-fuel and substantially pure oxygen into a regenerator, passing steam generated by a nuclear reactor into said regenerator, effecting gasification of the fossil-fuel in said regenerator by formation of CO and $H_2$ and thereby increasing the heat potential of the steam therein, storing a portion of the thus gasified fuel during off-peak hours of plant operation, introducing the thus heated steam and gasified fuel from said regenerator into a common burner and reacting said gasified fuel with oxygen therein, and passing the mixture of steam and combustion products from said burner to a turbine to drive same and an alternator drivably connected thereto.

* * * * *